SOLID STATE RECTIFIER WITH REVERSE CURRENT BLEEDING

Filed July 9, 1964 Sheet 1 of 4

THREE PHASE — TWO PHASE WAVE-FORM WITH REVERSE VOLTAGE

INVENTORS
J. V. McNulty &
D. E. Goodwin

BY Wilkinson, Mawhinney & Theibault
ATTORNEYS

INVENTORS
J. V. McNulty &
D. E. Goodwin
BY
Wilkinson, Mawhinney & Theibault
ATTORNEYS

SOLID STATE RECTIFIER WITH REVERSE CURRENT BLEEDING

Filed July 9, 1964

INVENTORS
J.V. McNulty &
D.E. Goodwin
BY
Wilkinson, Mawhinney & Theibault
ATTORNEYS INVENTORS
J.V. McNulty &
D.E. Goodwin BY Wilkinson, Mawhinney & Theibault
ATTORNEYS United States Patent Office 3,450,892
Patented June 17, 1969

3,450,892

SOLID STATE RECTIFIER WITH REVERSE CURRENT BLEEDING

Joseph V. McNulty, Middletown, and David E. Goodwin, Red Bank, N.J., assignors to Hanson-Van Winkle-Munning Co., Matawan, N.J., a corporation of New Jersey Filed July 9, 1964, Ser. No. 381,384
Int. Cl. H03k 3/00, 3/36, 3/44
U.S. Cl. 307—107 1 Claim

ABSTRACT OF THE DISCLOSURE

The invention comprises a solid state rectifier for producing an asymmetrical output in a polyphase system in which the output is characterized by a momentary negative pulse with the amplitude and duration of the pulse subject to control. In its simplest form, the rectifying elements comprise diodes and a reverse current bleeding means in the form of a fixed or adjustable resistor is placed in shunt with one of the diodes to determine or limit the current magnitude of the negative pulse or partial wave output. A further diode leg is opened to permit the negative pulse to be developed by current bleed back. A modification of the invention employs an SCR and series resistor in shunt with a diode rectifying element and additionally timer to fire the SCR thereby controlling the duration of the negative pulse relative to firing of the SCR with the magnitude of the negative pulse being determined by the resistor. Additionally, combinations of diodes and SCR's may be employed as the rectifying elements so long as at least one of the diodes is shunted by a resistor to produce the negative pulse or partial wave while the SCR's are open and the SCR's are fired under control of timing means.

The present invention relates to a solid state rectifier, the output of which is asymmetrical and has for an object to provide a rectified D.C. output which may be provided with a momentary negative pulse, the amplitude and duration of which may be varied.

Another object of the present invention is the provision of a solid state rectifier which may employ either diodes, SCR's (silicon controlled rectifiers) or combinations of both to produce the negative pulse wherein a reverse bleed from the D.C. side of the rectifier may pass or be shunted about the rectifying element in at least one leg of the circuit.

A further object of the present invention is to provide a solid state rectifier, the output wave form of which may be modified by the inclusion of a negative pulse therein, which negative pulse is obtained by eliminating or partly eliminating conduction in one leg and shunting a resistor in series with a SCR about the rectifying diode of another leg of the output circuit of the power transformer and controlling the firing of the SRC thereby to control the duration of the negative pulse assuming the amplitude thereof to be controlled by the value of the resistor; this resistor may be variable as well as fixed.

Application of the rectifier of the present invention is its use in the electroplating or electrochemical machining arts. In certain types of electroplating "trees" or "whiskers" or other types of roughness may occur. By reversing the polarity with a mechanical contactor these defects are reduced, giving the work greater smoothness or leveling and brightness. In electrochemical machining the rectifier of the present invention is useful by itself in removing the build-up on the end of the cutting tool, such removal being formerly continuously accomplished only by mechanical reversal of current from a D.C. rectifier.

The present invention reduces the time lag, incident to current reversed by mechanical means, by going to a solid state construction and provides more efficient handling of higher current in shorter periods of time. The prior art devices being mechanical in nature must be large, heavy, comparatively slow acting and prone to mechanical failure, in view of the required current carrying capacity.

The present invention eliminates these drawbacks since no moving parts are required.

The present invention provides means for changing the wave form, combining wave forms and obtaining either small or large reverse currents.

With the foregoing and other objects in view, the invention will be more fully described hereinafter, and will be more particularly pointed out in the claims appended hereto.

In the drawings, wherein like symbols refer to like or corresponding parts throughout the several views.

Figure 1B:
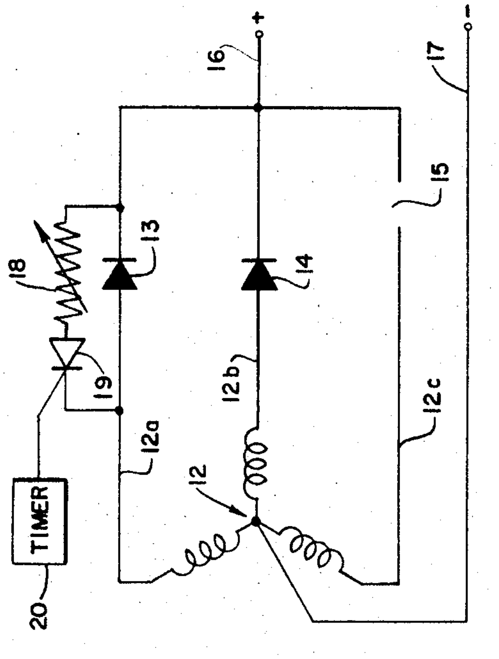
FIGURE 1B is a circuit diagram of the secondary output of a power transformer showing the solid state rectifier of the present invention modified in two of its output legs for controlling the amplitude and duration of the reverse current.
Figure 1:
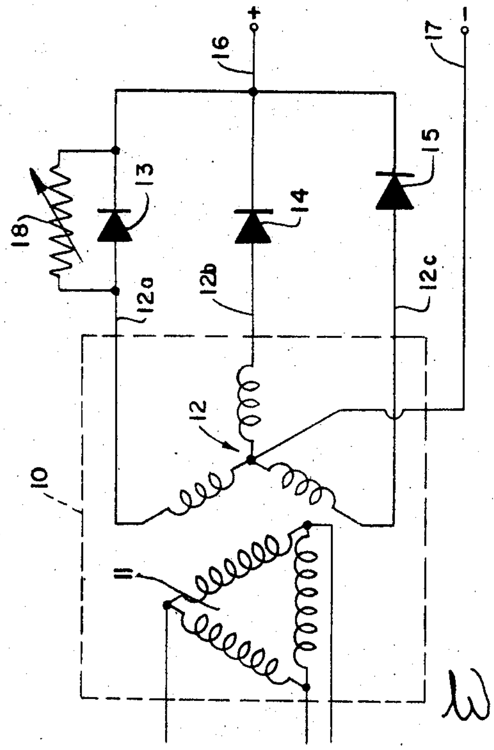
FIGURE 1 is a circuit diagram of a transformer and rectifier constructed in accordance with the present invention to show a leakage current arrangement, wherein the output secondary of the transformer is three-phase and the rectifying elements are diodes.

Referring more particularly to the drawings and for the moment to FIGURE 1, 10 designates a power transformer having a three phase primary 11 and secondary 12, which secondary is a three-phase output providing phases $12^a$, $12^b$ and $12^c$. In each of the output legs $12^a$, $12^b$, and $12^c$ are diodes 13, 14 and 15. The diodes are connected to the positive output 16 while the negative output 17 is center tapped from the three-phase Y.

Figure 1A:
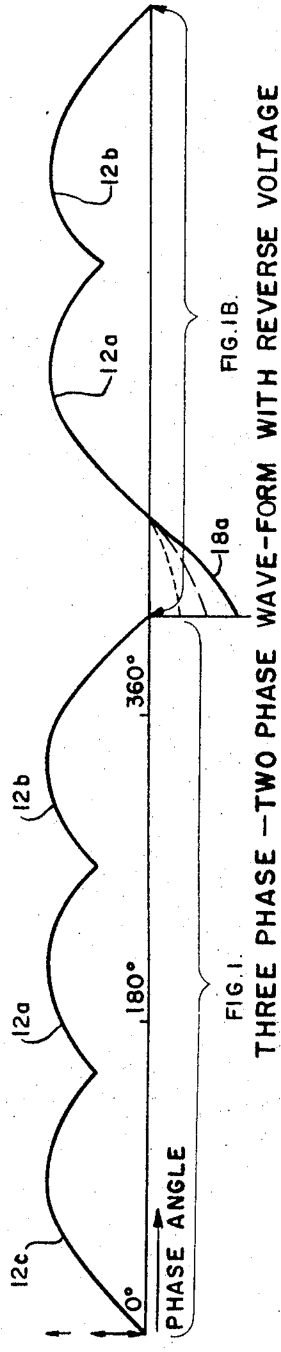
FIGURE 1A is a wave form of the D.C. output of the circuit of FIGURE 1.

The wave form shown in FIGURE 1A is the D.C. output of FIGURE 1. The leakage current is caused by a bleed resistor 18 shunted about the diode 13 in phase $12^a$.

The circuit in FIGURE 1B is similar to the circuit in FIGURE 1 with the exception of the modification in the shunt circuit about the diode 13 in phase $12^a$, and the elimination of diode 15 in phase $12^c$.

The shunt circuit about the diode 13 in phase $12^a$, while having the variable resistor 18, also includes in addition thereto an SCR 19 and a timer 20. The variable resistor 18 controls the amplitude of negative wave form $18^a$, while the firing of the SCR 19 under the control of the timer 20, controls the period of the negative wave form shown in FIGURE 1A. Reverse bleeding is permitted by interruption of phase $12^c$.

Figure 2:
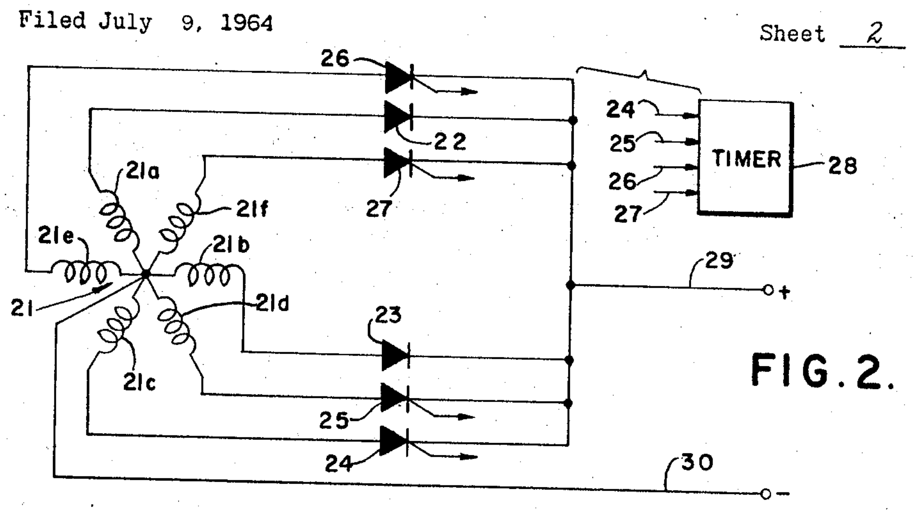
FIGURE 2 is a circuit diagram of the output secondary of a six-phase transformer showing rectifying elements in each output leg, some of which are diodes and some of which are SCR's.

FIGURE 2 shows a six-phase output secondary 21 having phases 21$^a$, 21$^b$, 21$^c$, 21$^d$, 21$^e$ and 21$^f$. Phases 21$^a$ and 21$^b$ have diodes 22, 23 while phases 21$^c$ through 21$^f$ have SCR's 24, 25, 26 and 27. The SCR's are controlled by a timer 28. The D.C. output terminals in FIGURE 2 are shown at 29 and 30, 29 being connected to the output of the diodes and SCR's and 30 coming from the center tap of the six-phase transformer.

Figure 2A:
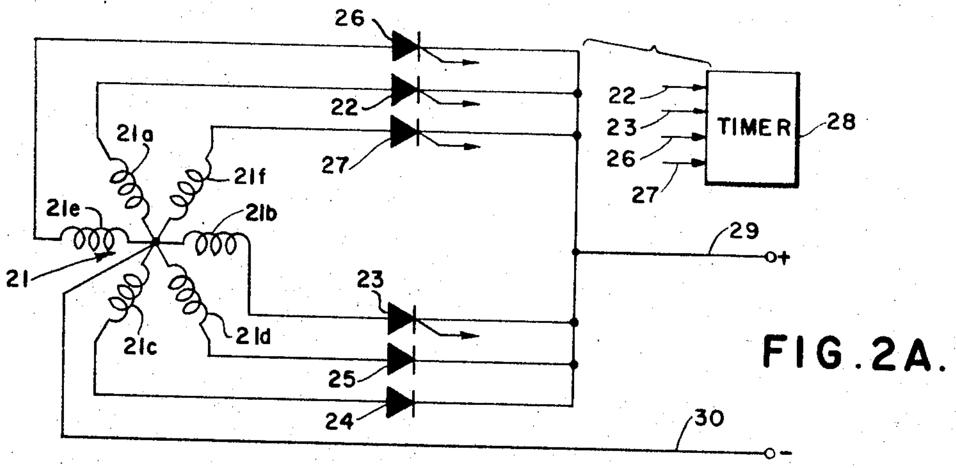
FIGURE 2A is a circuit diagram similar to FIGURE 2 in which the rectifying elements have been modified.

As best seen in FIGURE 2A, the construction is similar to FIGURE 2 with the exception that the diodes are in phases 21$^c$ and 21$^d$.

Figure 2C:
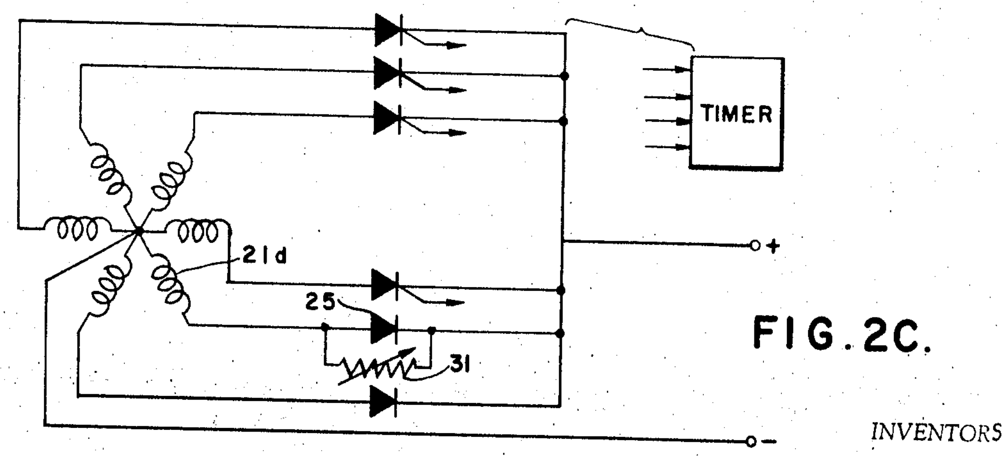
FIGURE 2C is a circuit diagram similar to FIGURE 2A with one output phase modified about the rectifying element of that phase.
Figure 2B:
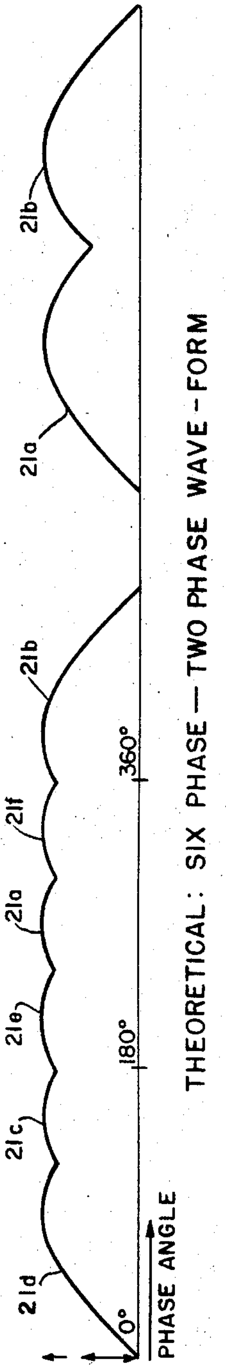
FIGURE 2B is a wave form produced by the construction of the circuit of FIGURE 2.

FIGURE 2B shows the wave form when four SCR's and two diodes are employed as in FIGURE 2. If all SCR's are turned full on, a six-phase wave form is produced, as shown on the left of FIGURE 2B. If the four SCR's 24, 25, 26, 27 (FIGURE 2) are turned off, only phases 21$^a$ and 21$^b$ conduct, as shown on the right of FIGURE 2B.

FIGURE 2C is substantially identical to FIGURE 2A with the exception that the phase 21$^d$ has been modified in that a bleed resistor 31 has been shunted about diode 25, this being a variable resistor for purposes of varying the amplitude of the negative current. The wave form of FIGURE 2E is obtained when employing the circuit of FIGURE 2C with provision for leakage current with 120 degrees of reverse voltage. The off time or reverse time can be further extended by using one phase in the forward direction rather than using two phases displaced 60 degrees apart.

Figure 2D:
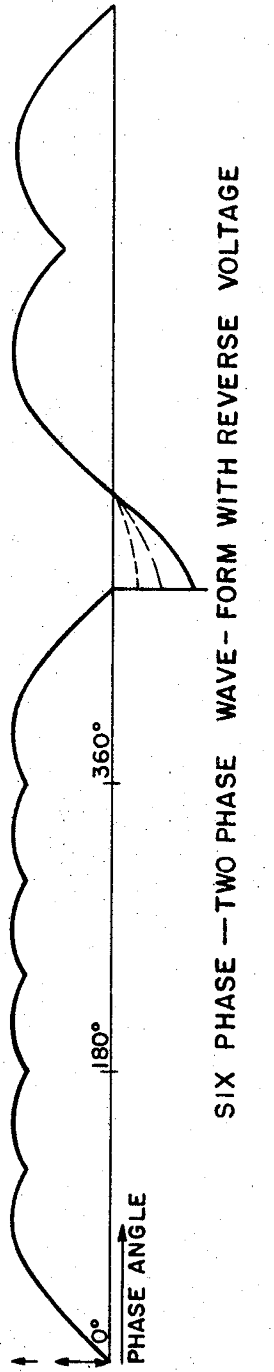
FIGURE 2D is a wave form produced by the D.C. output of the circuit constructed in accordance with FIGURE 2, with one output phase modified about the rectifying element of that phase.
Figure 2E:
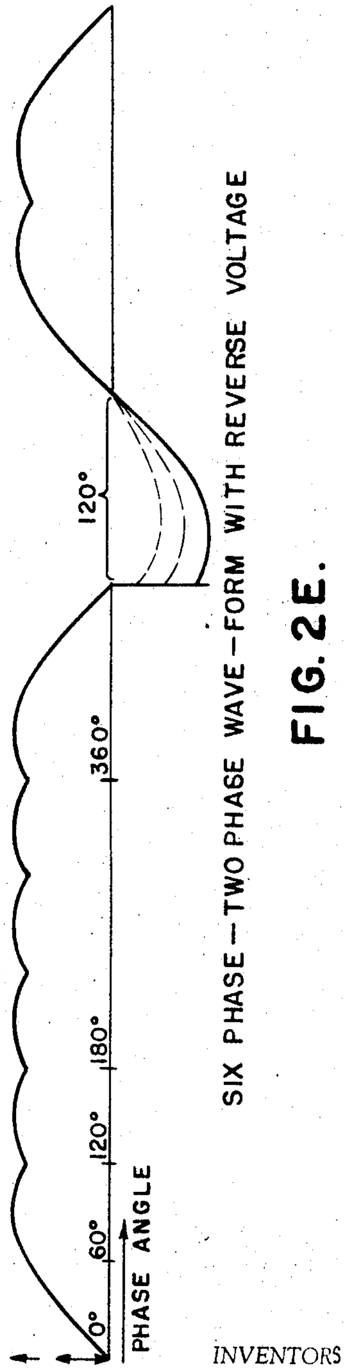
FIGURE 2E is a wave form of the DC output of the circuit of FIGURE 2C with 120 degrees of reverse voltage.

The waveform of FIGURE 2D is obtained by using the circuit of FIGURE 2 with a bleeder resistor about diode 22.

Figure 3:
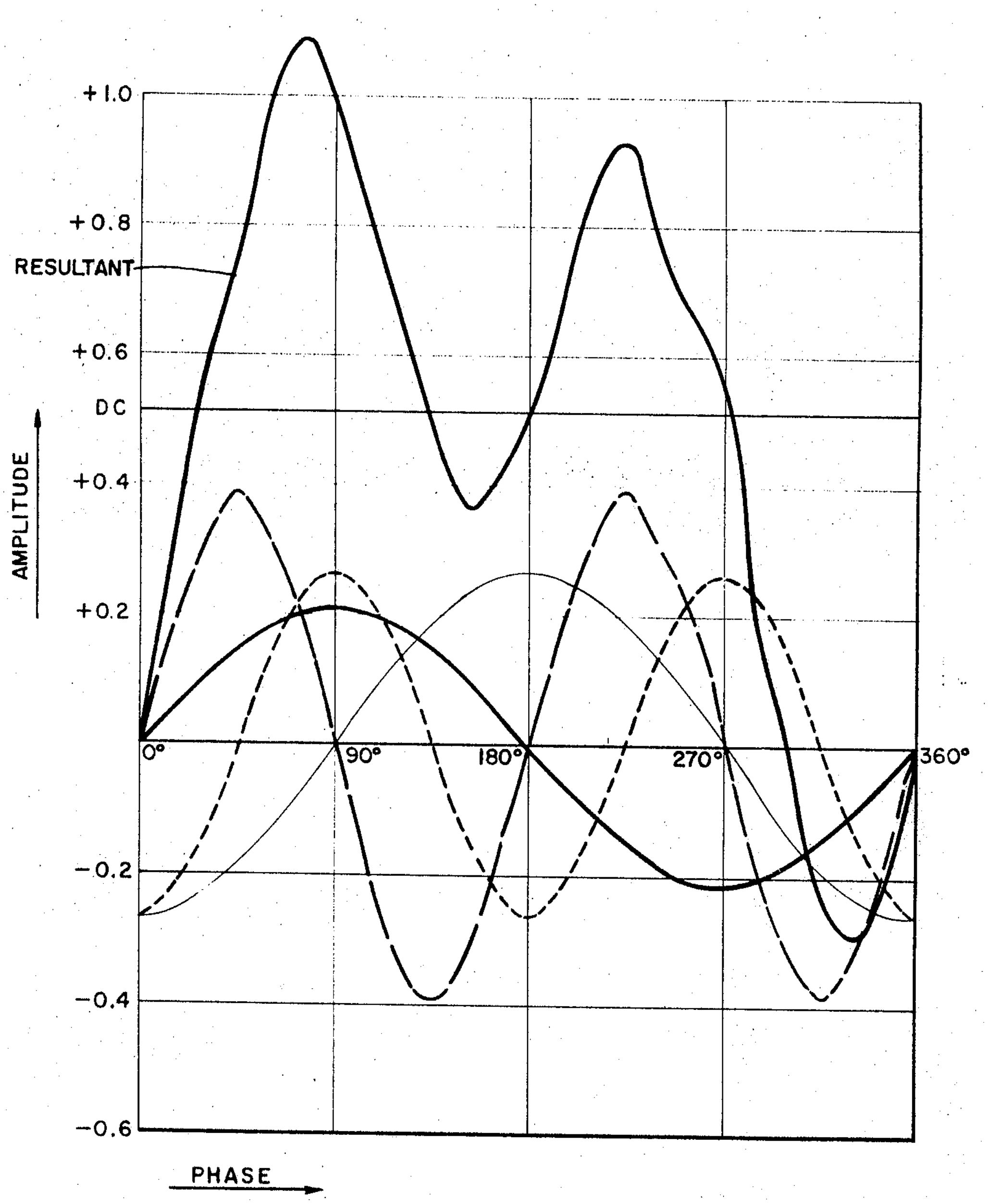
FIGURE 3 is a harmonic analysis of wave construction.

When the required waveform for a particular process or application of this recitifier has been established it is possible to construct this waveform by combinations of waveforms. If the required wave form is asymmetrical, a D.C. component is required along with the sine and cosine components of single frequency, double frequency, triple frequency, etc. One example showing harmonic analysis is set forth in FIGURE 3. The different sine, cosine components shown in FIGURE 3 can be generated by rotating equipment, but such an approach is, in general, more costly than the solution offered in the present invention.

When the solid state rectifier construction herein illustrated and described is applied to electroplating, it has been found that by varying the waveform by using a combination of three-phase or six-phase for one time domain and changing to two-phase for another time domain, the roughness, brightness and leveling can be favorably modified and optimized.

When applying the solid state rectifier herein illustrated and described to electrochemical machining, it is possible to cut metals by using the three-phase–two-phase or six-phase–two-phase circuits which could not be cut satisfactorily using a straight rectifier even when used with current reversal by mechanical means.

Using an acid electrolyte in electrochemical machining when cutting small deep holes and using current reversal for cleaning the tool, it has been found that the three-phase–two-phase and six-phase–two-phase solid state rectifiers could cut the hole and was far less critical in operation than when using the heretofore mechanical reversers.

The present invention offers additional advantages such as decreased physical size, greater reliability, lower costs and greater flexibility with more rapid time response than the mechanical current reversal systems heretofor available.

Although we have disclosed herein the best forms of the invention known to us at this time, we reserve the right to all such modifications and changes as may come within the scope of the following claims.

What is claimed is:

1. A solid state rectifier having an asymmetrical wave form comprising a transformer having a primary and a multiphase secondary having a secondary leg for each phase, combinations of semi-conductor diodes and SCR's in circuit with at least two output legs of the secondary of the transformer, combinations of SCR's for opening at least a further leg, reverse current bleeding means characterized by an adjustable resistor shunted about the diode in at least one output leg of the transformer secondary circuit to produce a negative output in the DC wave form due to the opened further leg while directly limiting the amplitude of the negative output, and a timing circuit for control of the SCR's to close them.

References Cited

UNITED STATES PATENTS

| | | | |
|---|---|---|---|
| 2,843,818 | 7/1958 | Mintz et al. | 321—16 |
| 2,959,724 | 11/1960 | Dortort | 321—16 |
| 3,225,283 | 12/1965 | Kurimura et al. | 321—25 XR |
| 3,260,922 | 7/1966 | Rieke | 321—16 XR |
| 3,274,479 | 9/1966 | Kurimura et al. | 321—25 |
| 1,708,908 | 4/1929 | Spencer | 321—5 |
| 2,474,866 | 7/1949 | Sciaky | 307—107 |
| 3,183,376 | 5/1965 | Boyer et al. | 307—107 |
| 3,304,486 | 2/1967 | Michaels | 327—22 |

FOREIGN PATENTS 145,673 6/1962 U.S.S.R.

MILTON O. HIRSHFIELD, *Primary Examiner.*

D. F. DUGGAN, *Assistant Examiner.*

U.S. Cl. X.R.

321—5